US005356172A

United States Patent [19]

Levy et al.

[11] Patent Number: 5,356,172

[45] Date of Patent: Oct. 18, 1994

[54] SLIDING SEAT ASSEMBLY FOR A PROPELLED WHEEL CHAIR

[75] Inventors: Moshe Levy, Kibbutz Tzora; Zvi Gilad-Smolinsky, 19 Moshe Sne Street, Danya, Haifa, Israel

[73] Assignee: Zvi Gilad Smolinsky, Danya, Israel

[21] Appl. No.: 141,908

[22] Filed: Oct. 21, 1993

Related U.S. Application Data

[63] Continuation-in-part of Ser. No. 918,305, Jul. 21, 1992, abandoned.

[30] Foreign Application Priority Data

Jul. 23, 1991 [IL] Israel ........................................ 98931

[51] Int. Cl.[5] .......................... B62B 7/10; A61G 5/00

[52] U.S. Cl. .................................... 280/650; 280/657; 280/250.1; 180/907; 297/344.11; 297/DIG. 4; 297/DIG. 10

[58] Field of Search ..................... 280/650, 657, 250.1, 280/304.1; 180/907; 297/344.11, 408, DIG. 4, DIG. 10

[56] References Cited

U.S. PATENT DOCUMENTS

| | | | |
|---|---|---|---|
| Re. 32,242 | 9/1986 | Minnebraker . | |
| 3,285,619 | 11/1966 | Kitrell et al. | 280/657 |
| 3,379,450 | 4/1968 | Jones et al. | 280/657 |
| 3,953,054 | 4/1976 | Udden . | |
| 4,310,167 | 1/1982 | McLaurin . | |
| 4,351,540 | 9/1982 | Minnebraker . | |
| 4,405,142 | 9/1983 | Whetsine . | |
| 4,447,098 | 10/1984 | Minnebraker . | |
| 4,489,955 | 12/1984 | Hamilton . | |
| 4,544,200 | 10/1985 | Dunn et al. . | |
| 4,545,593 | 10/1985 | Farnam . | |
| 4,575,113 | 3/1986 | Boudreau | 280/650 |
| 4,592,570 | 6/1986 | Nassiri | 280/650 |
| 4,607,860 | 8/1986 | Vogel | 280/657 X |
| 4,629,254 | 12/1986 | Stolper et al. | 297/344 X |
| 4,809,804 | 3/1989 | Houston et al. | 280/304.1 X |
| 4,852,899 | 8/1989 | Kueschall . | |
| 4,951,766 | 8/1990 | Basedow et al. | 280/304.1 X |
| 5,042,607 | 8/1991 | Falkenson et al. | 180/907 X |
| 5,050,899 | 9/1991 | Stensby | 280/304.1 X |
| 5,113,959 | 5/1992 | Mastov et al. | 180/907 X |
| 5,193,633 | 3/1993 | Ezenwa | 180/907 X |

FOREIGN PATENT DOCUMENTS

| | | |
|---|---|---|
| 2171898 | 9/1986 | United Kingdom . |
| 2201588 | 9/1988 | United Kingdom . |

*Primary Examiner*—Brian L. Johnson
*Attorney, Agent, or Firm*—Anderson Kill Olick & Oshinsky

[57] ABSTRACT

A hand-propelled wheelchair comprising a frame element to which is mounted a pair of large drive wheels and a pair of front caster wheels, the wheelchair further comprising a seat unit having a base and a back, the seat unit being slidably mounted on the frame in such a manner as to be manually slidable and arrestable in a plurality of desired positions along the frame element by the user while seated in the seat of the wheelchair, to vary the center of gravity of the user and the seat unit with reference to the axis of the drive wheels without disassembly of the drive wheels, the frame element or the seat unit from each other.

12 Claims, 9 Drawing Sheets

SLIDING SEAT ASSEMBLY FOR A PROPELLED WHEEL CHAIR

This is a continuation-in-part application of Ser. No. 07/918,305, filed Jul. 21, 1992 now abandoned.

BACKGROUND OF THE INVENTION

1. Field of the Invention

The present invention relates to hand-propelled wheelchairs.

More particularly the present invention relates to improved wheelchairs enabling the variance of the center of gravity of the user and the seat of the wheelchair with reference to the axis of the drive wheels.

2. Description of the Related Art

In the last decade many patents have issued which propose various ways to change or alter the overall center of gravity of the wheelchair for different purposes.

Thus, e.g. U.S. Pat. No. 4,310,167 describes and claims a variable position center of gravity wheelchair comprising an articulated chassis having a subframe to which is mounted a pair of main wheels and a rear caster wheel, and a seat frame assembly carrying a seat and a front caster wheel and connected to the subframe for movement relative thereto between a first position with the seat positioned over the main wheels and a second position forwardly of the main wheels to facilitate curb climbing; said main wheels and front and rear caster wheels being arranged in a diamond pattern whereby lateral drift of the wheelchair is minimized while traversing sloping surfaces; and resiliently yieldable means connected between the subframe and seat frame assembly to minimize the tendency for the front caster wheel to lift off the ground when the main wheels are strongly propelled, and to provide shock absorption when traversing rough ground.

As stated in said above noted Patent, the principal object thereof was the design of a wheelchair which can traverse sloping surfaces without experiencing side drift and yet which may be easily manipulated to climb curbs and the like and which may traverse rough ground without undue discomfort to the user.

A still further object of said patent was to provide a movable center of gravity wheelchair in which the seat and thus the center of gravity is located essentially over the main wheels during normal use but in which means is provided for easily shifting the seat and center of gravity forwardly to remove weight from the main wheels to facilitate curb climbing.

The disadvantage of said arrangement is that it is limited to articulated movement of a subframe comprising the seat and front caster wheel from a first position to a second position for curb climbing.

In a series of Patents by J. P. Minnebraker there is described a different type of wheelchair construction enabling the use of the same wheelchair for normal riding conditions and in sports activities.

Thus, as described in U.S. Pat. Nos. 4,351,540 and 4,477,098 and in U.S. Pat. No. Re. 32,242 wheelchair constructions have remained unchanged, except for relatively minor features for a substantial period of time. While wheelchairs have existed for many years, they generally were constructed of a main frame, front and rear wheels, side rails or so-called "arm rests" and foot support members. However, there was no means for creating or manufacturing a wheelchair of different sizes, at a relatively low cost, from standard sized components, in order to accommodate different size users.

Prior art wheelchair manufacturers constructed several different sized wheelchairs and used different sized components for each of the differently sized wheelchairs. In the case of a tall individual, the main frame had to be larger, the seat located in a different position, and a foot support member extended further from the seat, than in the case of a wheelchair for a smaller individual. In addition, for the larger sized wheelchair, the seat may have to be located at a higher elevation in order to permit the user to engage rims on the wheels for propelling the wheelchair in an easy and convenient manner.

Notwithstanding, heretofore there has not been any wheelchair which is designed for anything except normal transport. In other words, wheelchairs heretofore constructed were not designed to permit any form of athletic activity, and particularly, for fast-moving sports activities. This was primarily due to the fact that the prior art wheelchairs were all of a box-like construction with the seat, and hence, the center of gravity, located at a fixed and at a substantial distance above the ground. Consequently, the prior art wheelchairs were not designed for any fast movement, and if one attempted to propel any of the prior art wheelchairs at any significant speed, or attempted to turn a corner quickly,the wheelchair might well tip over, causing injury to the user.

In recent years, it has been found to be highly beneficial for paraplegics and others required to use wheelchairs on a relatively permanent basis to engage in various forms of athletic activities, including wheelchair racing, tennis and the like. However, the wheelchair construction heretofore did not lend themselves to such form of activities.

In the wheelchairs described in each of said Patents and especially in U.S. Pat. No. Re. 32,242 there is described and claimed an apparatus for selectively positioning the rear wheels of a wheelchair having a frame means to selectively alter the center of gravity thereof, said apparatus comprising:

a. a first pair of connected and spaced apart plates provided for attachment to one side of said frame means and a second pair of connected and spaced apart plates provided for attachment to an opposite side of said frame means.

b. a plurality of axle receiving openings on each of said pairs of spaced apart plates and the openings in the plates of each pair being aligned so as to be capable of receiving a rear wheel axle in each of said axle receiving openings, c. a separate rear wheel axle capable of extending outwardly from the rear wheel axle openings on each of said pairs of plates, d. flange means on at least one of the plates of each of said pairs for fastener attachment to a frame means of said wheelchair such that the pairs of plates can be attached to the frame means in any of a plurality of selected locations to accommodate the size and intended use of a user.

e. quick release means associated with said rear wheel axle to enable quick release and replacement of rear wheels on said rear wheel axle, such that said axle can be easily removed from one location and replaced in another axle receiving location on said plates so that the response and center of gravity and wheel base on said frame can be easily and quickly altered.

Thus, Minnebraker's approach to providing a multifunctional wheelchair which would be used for normal indoor and outdoor use as well as for sports activities was based on providing the frame with a plurality of axle receiving openings so that the center of gravity of the wheelchair could be altered by disassembling the wheelchair and repositioning the wheels relative to the frame.

In U.S. Pat. No. 4,405,142 there is described and claimed a similar arrangement of a quick breakdown wheelchair assembly comprising a pair of side frames wherein each of said side frames includes a wheel bracket for detachably mounting a wheel, said wheel bracket having a plurality of axle mounting bores.

While this approach has been adopted on wheelchairs marketed today, it has many disadvantages as discussed fully in U.S. Pat. No. 4,852,899 which points out that with the growing participation of wheelchairs in sports, greatly increased demands have been placed upon the balance and as well the general maneuverability of a wheelchair. In this regard decisive meaning has been attached to the maneuvering speed of the so-called sportschairs, in particular with the basketball wheelchairs.

Modification of the center of gravity of a chair raises or lowers the maneuvering speed of these chairs. However, on the one hand it should not be forgotten that each modification of the center of gravity naturally changes and affects the stability and/or tipping possibilities of the device with increasing degree.

Further, it is generally recognized that the more a person moves the axles for the two load bearing rear wheels rearwardly, that is, displacement in the direction opposite from the two front wheels of the wheelchair, the more stabilization is gained for the wheelchair as such. On the other hand, with such adjustment the front part of the wheelchair becomes heavier and heavier, as is apparent from its own weight, and with this, naturally, comes decreased maneuverability.

Besides the individual possibilities of shifting the center of gravity, there is also the need to take into consideration for today's state of the art the various adjusting possibilities for the angle of the seat, the angle of the backrest in regard to the seat surface as well as the adjustment possibility of the camber of the rear wheels in order to shift the height of the center of gravity.

For adjusting the center of gravity in relation to the seat surface one can make use of essentially two adjustment criteria in the state of the art. For structural solution to the shifting of the center of gravity below the seat surface of a wheelchair, one utilizes a rearrangement of the two large drive wheels of the wheelchair. These two drive wheels are for the most part repositionable back and forth along their axes in longitudinal guides of the so-called axial support plates. By these means, the wheels themselves can be adjusted in a direction closer to or further from the smaller front wheels.

For angular adjustment of the seat back of the wheelchair with response to the seat surface, the so-called "positioning angle" has been primarily employed in the prior art. By these means the seat back is adjusted for each application and then is fixedly locked in the adjustment position by means of this positioning angle.

In addition, in the prior art, the two front wheels are not directly connected with the frame bars of the seat surface, but instead they are pivotally connected to this frame so that they work as carrying bars which extend parallel to the seat surface frame bars. In this regard, they are also angularly adjustable as is illustrated for example on page 15 of the publication mentioned immediately above.

It has also been established in the prior art to be a serious disadvantage first that precise adjustment of the three interrelated adjustment parameters with respect to one another, these being the position of the axles of the rear wheels, the position of the vertical axles of the front wheels and the angle between the seat surface and the back rest, is achieved only with great difficulty. For this the two rear wheels in certain constructions are always individually adjustable, that is, the axles of each individual wheel are separately and distinctly adjusted. It is therefore not difficult to demonstrate how easily a small change in the setting of one wheel axis can affect the other two wheel axes. Now this however, leads to a skewing of the actual wheel axis relative to the seat surface of the wheelchair, and with it a disadvantageous modification of the balance and also, quite substantially, the tracking of the wheelchair. Still more severely dominant, however, is the shifting which thereby occurs such that the fixing means of one wheel becomes dissociated from the other wheel and introduces the possibility of a completely unexpected shifting of one wheel axis with respect to the opposing wheel axis.

Furthermore, tools are required to effect a positional change, so in practice the position chosen is usually retained without change.

To overcome the above problem U.S. Pat. No. 4,852,899 suggests that by adjusting two telescoping-type interengaging shiftable parts for each of two frame bars of a support frame of a lightweight wheelchair, the sitting position of the same can be adjusted with respect to the seat surface and with it the adjustment of the center of gravity can be dynamically adjusted with respect to the user.

Thus, said patent provides a lightweight wheelchair adjustable for a specific balance, comprising a seat arranged on two frame bars characterized in that the frame bars at the seat level have at least two parts telescopically adjustable relative to one another and adjustably connecting the back rest with the support frame to selectively shift the position of the back rest relative to the seat.

It is not possible to effect a positional change while the user occupies the seat of the wheelchair.

This arrangement has the disadvantage that the center of gravity is shifted by forcing the user to sit further back or further forward in the seat as a function of the positioning of the backrest which is a source of discomfort to the user.

In U.S. Pat. No. 4,489,955 there is also cognizance of the disadvantage of providing a wheel bracket having a plurality of axle mounting bores for repositioning of the wheels relative to the frame to adjust and vary the center of gravity and thus said patent suggests yet another approach to this problem.

Thus said patent inter alia describes and claims a wheelchair comprising a base frame comprising a pair of side plates and a web extending between said side plates; a plurality of wheels including two drive wheels and at least one other wheel; means for propelling said drive wheels, said means consisting of hand engagable rim means associated with said drive wheels; means for mounting said wheels to said base frame, but so that the wheelbase thereof is substantially fixed; chair support means; and means for mounting said chair support means to said frame so that the position of said chair support means with respect to said frame and with respect to said drive wheels is adjustable, so that the center of gravity of said wheelchair is adjustable by adjusting the portion of said chair support means with respect to said frame, and without adjustment of the position of said drive wheels with respect to said frame, said means comprising: a pair of inner and outer flanges of said chair means for receipt of each of said frame side plates; means defining elongated openings in said web adjacent each of said side plates; and fastener means extending through said elongated openings into operative association with said chair support means.

As will be realized said patent also has the same disadvantage as the means suggested by Minnebraker in that the center of gravity for any specific use must be prechosen and fixed before the user mounts the chair thereby increasing the dependency of the user on others and failing to provide dynamic versatility.

SUMMARY OF THE INVENTION

With this state of art in mind, there is now provided, according to the present invention a hand-propelled wheelchair comprising a frame element to which is mounted a pair of large drive wheels and a pair of front caster wheels, said wheelchair further comprising a seat unit having a base and a back, said seat unit being slidably mounted on said frame in such a manner as to be manually slidable and arrestable in a plurality of desired positions along said frame element by the user while seated in the seat of the wheelchair to vary the center of gravity of the user and the seat unit with reference to the axis of the drive wheels without disassembly of the drive wheels, the frame element or the seat unit from each other.

In a first preferred embodiment of the present invention said base and back are hingedly attached to each other, said base and back being arrestable in at least one position defining an angle of greater than 100° therebetween to provide a wheelchair with a reclining backrest.

As will be realized the present invention provides for the first time a versatile multifunctional wheelchair having a multiplicity of possible positions of altered center of gravity effected by the user himself while comfortably sitting in the seat of the wheelchair.

Thus e.g., even in a simplified version of a wheelchair according to the present invention, used in a geriatric ward, the user when wishing to recline can simply move the center of gravity of himself and the seat unit forward with reference to the axis of the drive wheels so that upon reclining the wheelchair does not tip over backwards.

For the more active user of the proposed wheelchair, the advantages are much more numerous. Thus as is known, on normal sidewalks there exists a slight incline towards the gutter of about 2 to 3 degrees for drainage purposes. A person riding in a wheelchair on such a sidewalk perpendicular to the direction of incline finds that the wheelchair drifts in the direction of incline and this inter alia, because the center of gravity of the wheelchair is normally positioned forward of the contact point between the drivewheels and the ground.

Traveling along such sidewalks in such a manner is uncomfortable since the user must use one hand to propel one of the drive wheels, while the other hand is used to brake the second drive wheel counter the tendency to drift in the direction of the incline.

In the wheelchair according to the present invention, this problem can be ameliorated by simply sliding the seat backwards along the frame to an arrested position of minimal distance between the center of gravity and the axis of the drive wheels.

Similarly, moving the seat forward in relation to the frame moves the center of gravity forward and provides greater stability for the wheelchair in climbing curbs or steep slopes.

Conversely, moving the seat backwards in relation to the frame, moves the center of gravity backward and gives greater stability when the wheelchair is going down an incline slope.

As indicated hereinbefore, the manueverability of a wheelchair is principally determined by the relationship between the center of gravity and the axis of the drive wheels. When the center of gravity is closer to the axis of the drive wheels, the effect on the casters is less and the wheelchair has greater maneuverability. Therefore, moving the center of gravity backwards adapts the wheelchair for greater maneuverability for sports and activities such as basketball and tennis.

Another problem solved by the present wheelchair is that of change in the center of gravity as a result of a change in the weight load in the chair. Thus, e.g., when the user of the chair takes a child on his lap or is carrying packages, the center of gravity of the chair is shifted from the optimum which existed before. With the chair of the present invention, the user simply slides the seat in relation to the frame to find the best position which restores said optimum.

In the preferred embodiments of the present invention said frame element is rigid having a first frame bar defining a first axis to which said drive wheels are attached.

Since in these embodiments the seat unit is foldable onto the frame rather than the frame itself being foldable the seat can be orthopedically contoured for maximum comfort and support.

In an especially preferred embodiment of the present invention said seat unit is attached to said frame via a linkage arrangement for varying the vertical distance between said seat base and said frame.

As will be described with reference to the figures hereinafter, this feature provides even greater versatility for wheelchairs according to the present invention. Thus, in preferred embodiments said seat base is hingedly attached to at least one linkage arm which arm is in turn hingedly attached to a mounting member slidingly mounted on said frame.

Preferably, said hinges include integral indent and/or guide and stop means which fully define and delimit predetermined angular positions of said linkage arm with respect to said base and said frame element and said hinges are designed so as to restrict the freedom of movement of said linkage arm to only one plane.

The above features enable the user to choose and control by himself his position relative the ground and the axis of the wheels thus providing versatility and independence heretofore not available with prior art wheelchairs.

In U.S. Pat. No. 3,953,054 there is described and claimed a wheelchair which includes means for adjusting the height of the seat, however, this patent describes adjustment means which are to be preset before the user sits in the wheelchair and not adjustment means to be operated by the user while sitting as the need for adjustment arises.

Thus this patent in effect teaches an adjustable office chair provided on a wheelchair chassis.

The wheelchair of the present invention can be used in conjunction with an electric drive attachment of the type described, e.g., in U.S. Pat. No. 5,113,959, filed Aug. 30, 1990 and the teachings of which are incorporated herein by reference.

Similarly the wheelchair can be used in conjunction with an electrically powered hydraulic or mechanical or pneumatic jack as described hereinafter.

Employing the above features it is possible to even adapt the proposed wheelchair to function as a stand-up wheelchair, e.g., by providing an arrangement wherein said linkage arm is hingedly attached to a front surface of said base and said linkage arrangement is arrestable in at least one position defining an angle greater than 90° between the bottom surface of said base and said linkage arm thereby enabling the positioning of said base in an orientation approaching perpendicular with the ground for adaptation of said wheelchair for use as a stand-up wheelchair.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENTS

Figure 1:
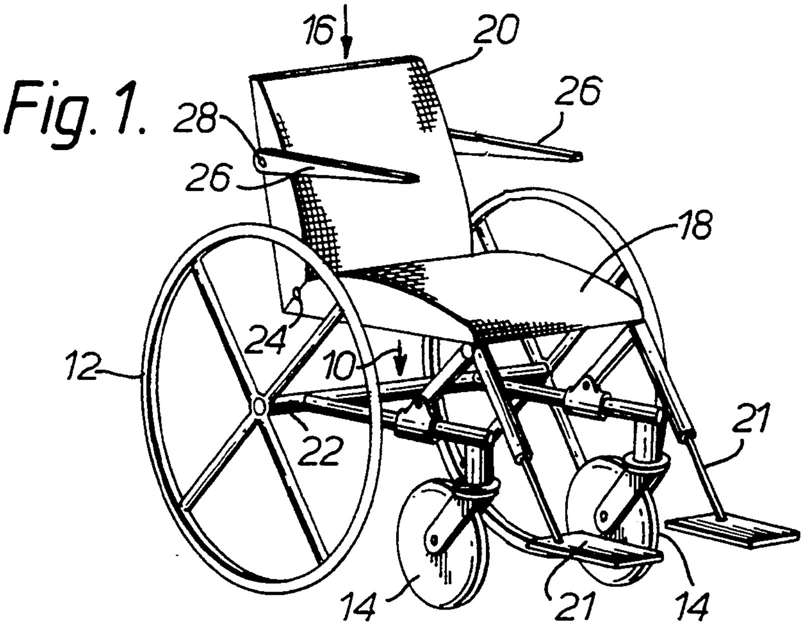
FIG. 1 shows a perspective view of a preferred embodiment of the wheelchair according to the invention.
Figure 2:
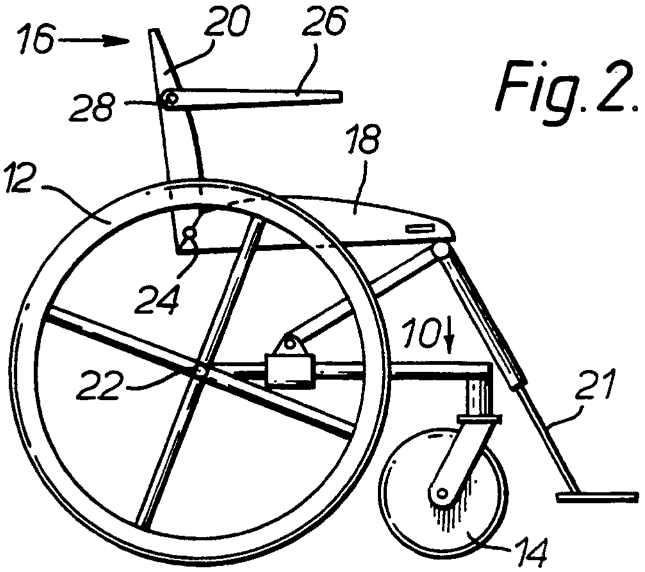
FIG. 2 is a side view of the same embodiment.

There is seen in FIGS. 1 and 2 a wheelchair provided with a frame element 10 to which is mounted a pair of large drive wheels 12 and a pair of front caster wheels 14. A seat unit 16 having a base 18 and a back 20 supports also a pair of footrests 21, and is slidably mounted on the frame element 10, being manually slidable and arrestable in a plurality of desired positions along the frame element 10 by the user while seated in the seat unit 16 to vary the center of gravity of the user and the seat unit with reference to the first axis 22 of the drive wheels 12 without disassembly of any parts of the wheelchair.

Figure 11:
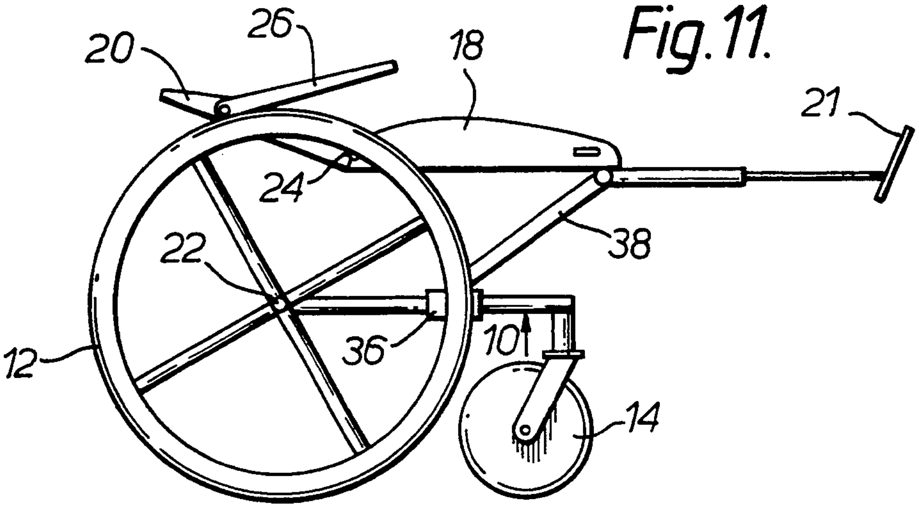
FIG. 11 is a side view of the embodiment of FIG. 2 but adapted for use of a reclining person.

The base 18 and the back 20 are both upholstered rigid bodies, thus providing the user with a comfortable seating posture for the extended time periods that the user is likely to remain seated. Furthermore, the base 18 and the back are hingedly attached to each other by a variable angle hinge 24, and are thereby arrestable by menu know per se in various positions, at least one position defining an angle of greater than 100° therebetween to provide a wheelchair with reclining backrest as will be described with reference to FIG. 11.

For further improvement of the sitting posture the seat unit 16 is orthopedically contoured.

Armrests 26 are attached to back 20 by means of hinges 28, these too being arrestable at various angular positions. Armrests 26 are pivotally attached to back 20 like linking arms 136 are attached to backrest 140 in U.S. Pat. No. 3,379,450, E. Jones, et al, incorporated herein by reference.

Figure 3:
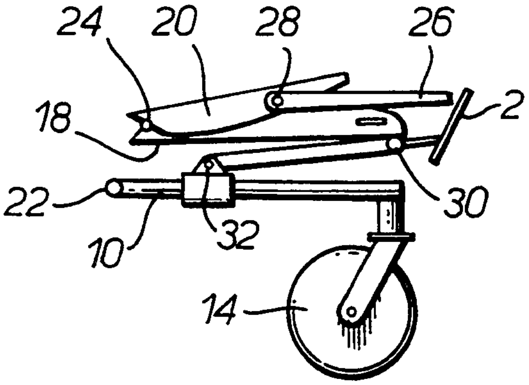
FIG. 3 is a side view of the same embodiment after disassembly of the drive wheels and folding for transport or storage.

FIG. 3 shows the same embodiment after disassembly, for purposes of transport or storage, of the drive wheels 12. The frame element 10 is hingedly interconnected by a plurality of hinges 30, 32 having axes extending perpendicular to a vertical central plane of symmetry of the wheelchair. The drive wheels 12, which are not shown in this figure, as they have been disassembled, are demountably attached to the first axis 22 of the frame element 10. Wheels which are demountable have been described in the following patents, U.S. Patent No. 4,592,570 to Nassiri and U.S. Pat. No. 4,405,142 to Whetstine, which are both incorporated herein by reference.

Base 18 which in turn is seen folded onto the frame element 10 to form the compact lightweight array shown.

The dimensions of the folded wheelchair may be reduced further than that shown in FIG. 3 by also disassembling the caster wheels 14. Foldable wheelchairs and wheelchair kits have been described in U.S. Pat. No. 4,607,860 to Vogel and U.S. Pat. No. 4,575,113 to Boudreau, both herein incorporated by reference.

Figure 9:
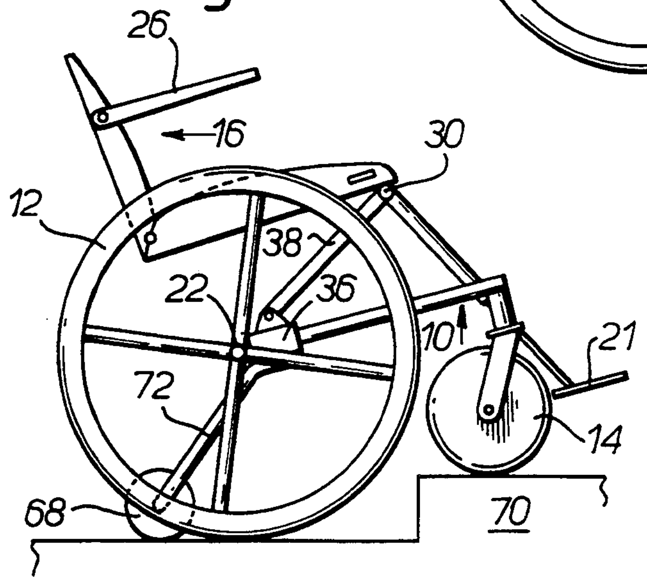
FIG. 9 is a side view of a further embodiment provided with auxiliary wheels.

Here it should be noted that the convenient demountability of the drive wheels 12 from the first axis 22 is of further utility for passage in very narrow pathways such as are found, for example, in passenger aircraft. In such circumstances the auxiliary wheels 68 which will be described with reference to FIG. 9 are used, the drive wheels 12 having been disassembled.

Figure 4:
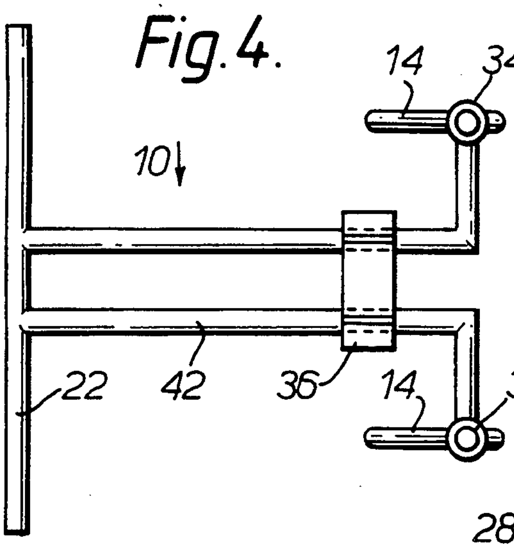
FIG. 4 is a plan view of the frame element.

FIG. 4 shows the frame element 10 which is rigid, having a first frame bar defining a first axis 22 to which drive wheels 12 are attachable. Therefore the wheelchair of the present invention, unlike most known wheelchairs, remains rigid in both horizontal directions. Folding is achieved in the vertical direction, as has been explained with reference to FIG. 3. The caster wheels 14 are revolvably supported in bearings 34. The mounting member 36 will be described with reference to FIGS. 6A-6B.

Figure 5:
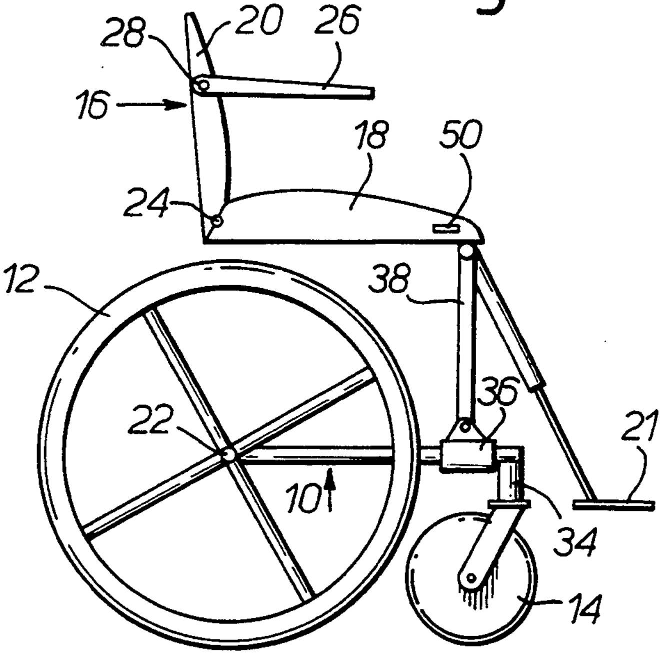
FIG. 5 is a side view of the same embodiment but adjusted to provide a high seating position.

There is seen in FIG. 5 the same embodiment as in FIG. 2 but is shown here adjusted to provide a high seating position such as might be required by a tall user. The extra height shown is obtained by locking the linkage arm 38 in a vertical position. Conversely, it is of course possible to lock the linkage arm 38 in a horizontal or near horizontal position to obtain a very low seating position to suit the requirement of a very short user. The desired position of the center of gravity of the seat unit 16 with user can still be maintained at a desired location by moving the mounting member 36 as will be explained.

Figure 19:
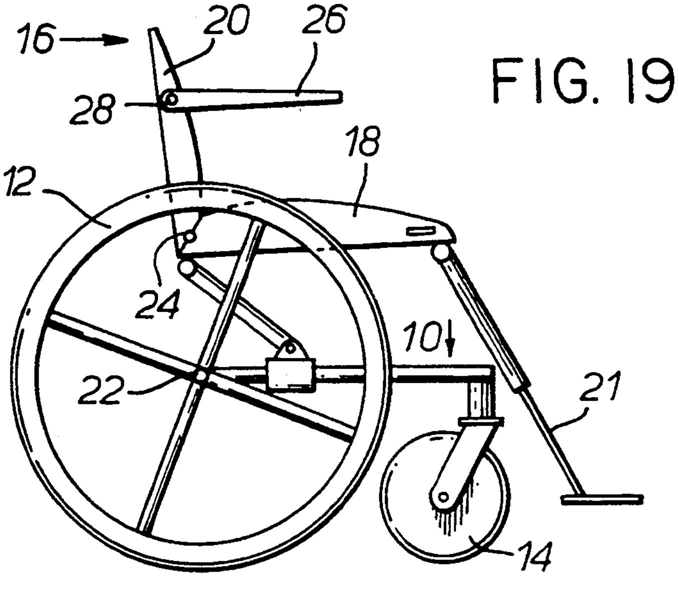
FIG. 19 is a side view of another embodiment.

The embodiment illustrated in FIGS. 1-5 includes two linkage arms 38 which are hingedly attached to the rear edge of the base 18. However, as seen in FIG. 19, the linkage arm 38 may be hingedly attached to the front edge of the base 18. It is also possible for an embodiment of the wheelchair to have one or more linkage arms 38 hingedly attached to the front edge of base 18 while another set of one or more linkage arms 38 are hingedly attached to the rear edge of base 18.

Figure 20:
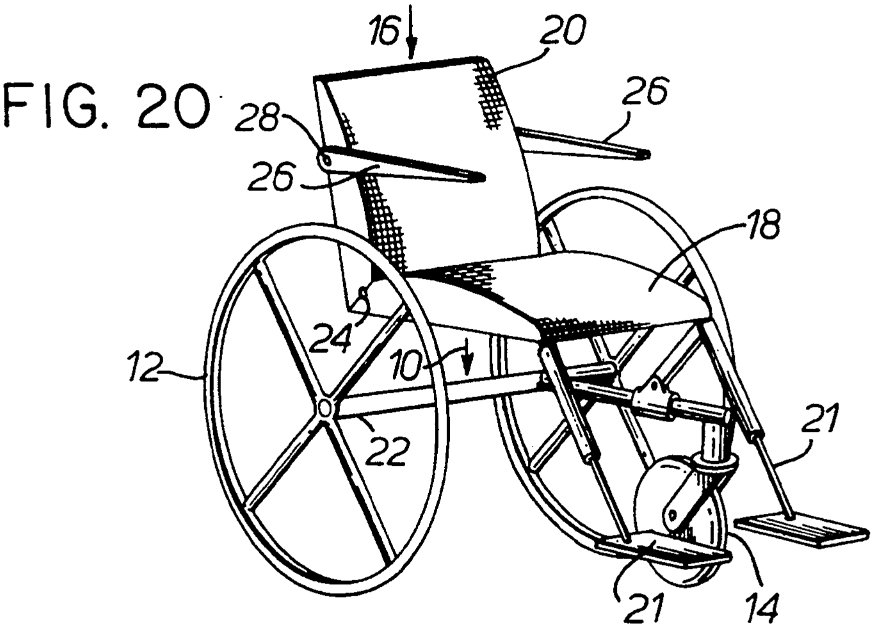
FIG. 20 shows a perspective view of yet another embodiment.

Additionally, FIG. 20 illustrates another embodiment in which one linkage arm 38 is hingedly attached to base 18 and slidably connected to one horizontal member of the frame element. Another wheelchair having only one caster wheel is illustrated in U.S. Pat. No. 4,310,167, McLaurin, incorporated herein by reference.

Figure 6A:
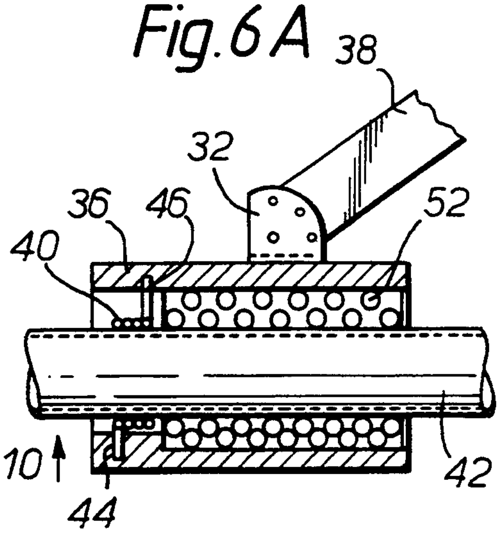
FIGS. 6A and 6B are cross-sectional views of a preferred embodiment of the mounting member.
Figure 6B:
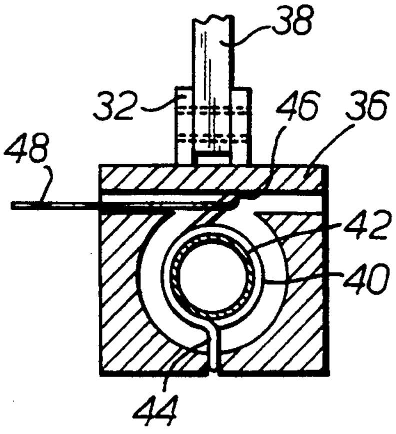

FIGS. 6A and 6B show a preferred embodiment of the mounting member 36, which is provided with means for frictional engagement to the frame element 10. Means are provided for selectively clamping and unclamping the mounting member to the frame element 10.

In the preferred embodiment shown, these means are provided in the form of a coil spring 40 assembled around and frictionally engaging and clamping a horizontal member 42 of the frame element 10, one extremity 44 of the coil spring 40 being attached to the mounting member 36 and the remaining spring extremity 46 being attached to a tensioning device such as a cable 48, which when tensioned by the user by means of a handgrip 50 shown in FIG. 5, to which it is attached (not shown) slightly unwinds and expands the coil spring 40 and thereby releases the frictional engagement between the coil spring 40 and the horizontal member 42.

Figure 7:
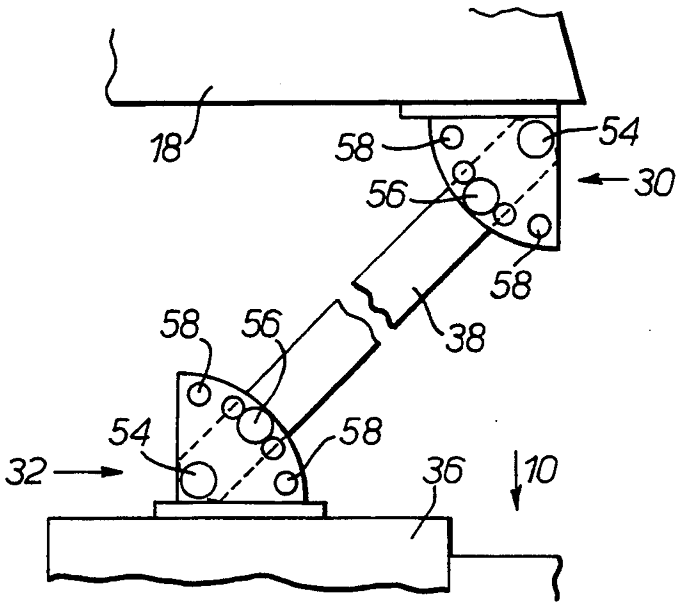
FIG. 7 is a side elevation of the linkage arm and a preferred embodiment of its hinges.
Figure 8:
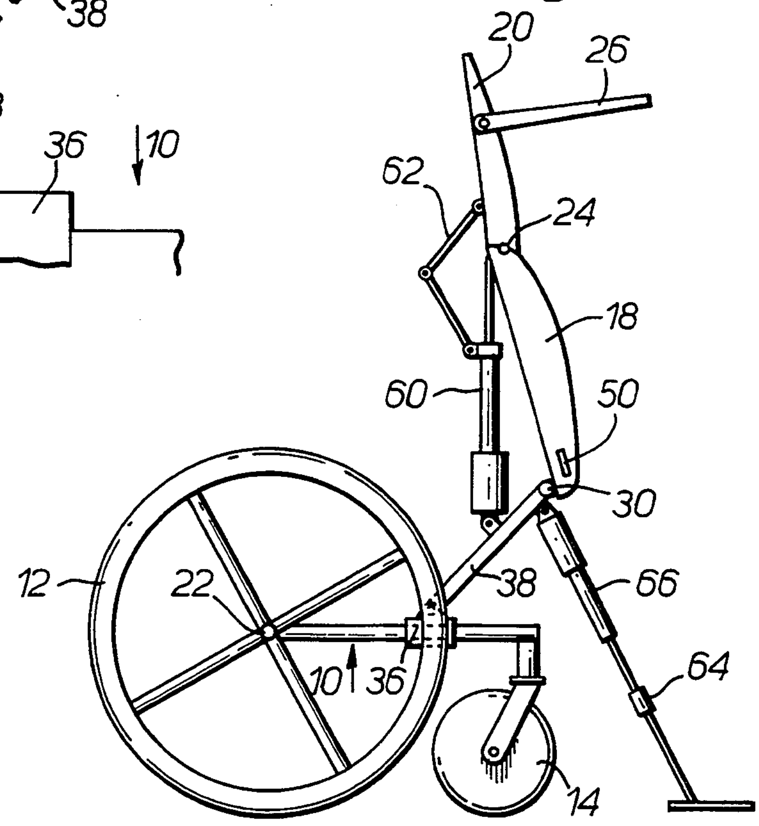
FIG. 8 is a side view of an embodiment of the wheelchair adapted for use of a standing user.
Figure 16:
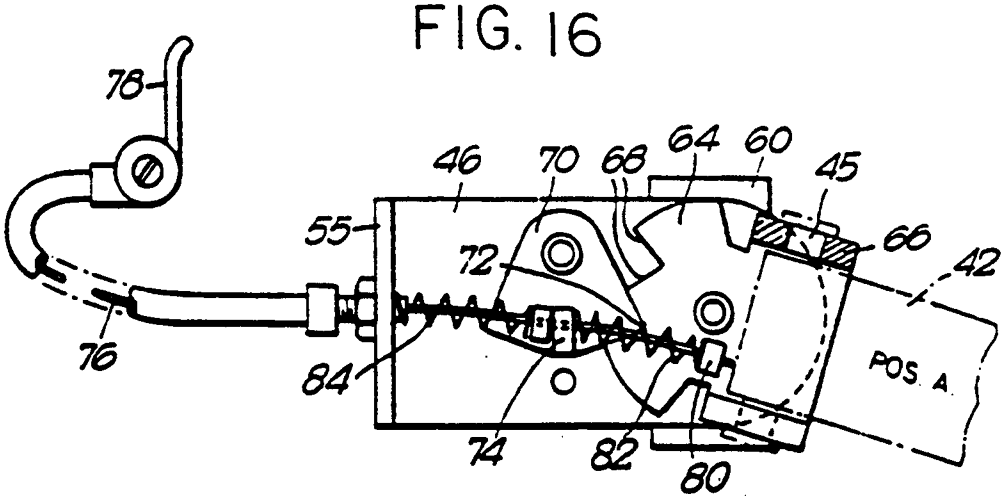
PRIOR ART FIG. 16
FIGS. 16–18 illustrate successive stages in locking and unlocking the mounting member of a prior art wheelchair.
Figure 17:
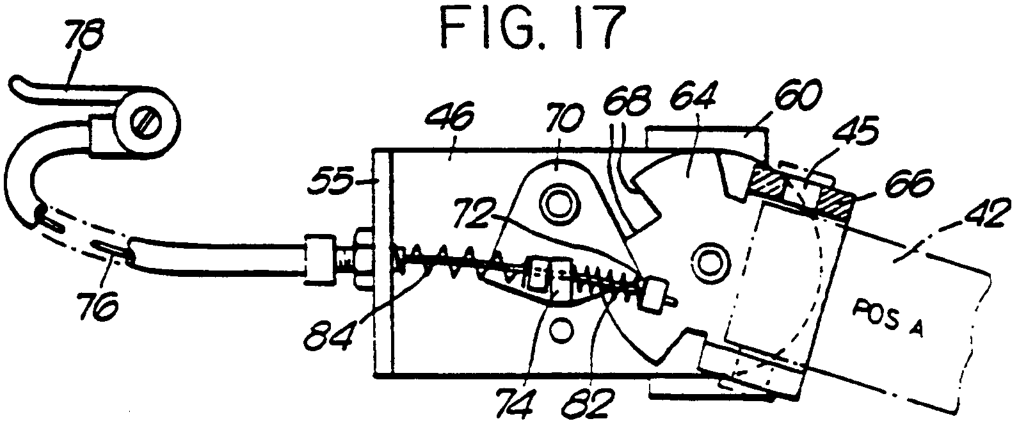
PRIOR ART FIG. 17
Figure 18:
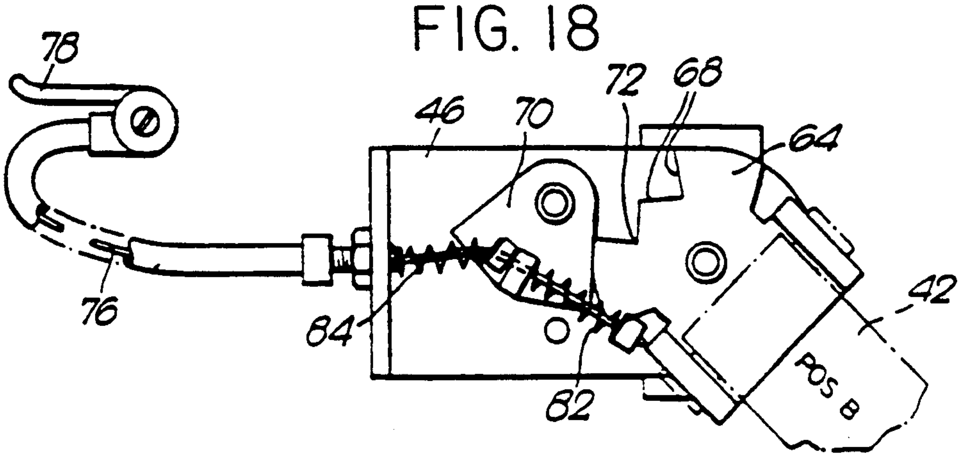
PRIOR ART FIG. 18

In another patent, U.S. Pat. No. 5,113,959, a handle and cable connected to a spring are used for adjustment means. FIGS. 7, 8 and 9 are of U.S. Pat. No. 5,113,959, are included herein as prior art FIGS. 16, 17 and 18.

When tension is released by the user, the coil spring diameter reverts to a smaller dimension, thereby causing re-engagement of the coil spring 40 and the horizontal member 42. It will be noted that this form of frictional clamping can be repeated many times without marring the smooth outer surface of the horizontal member 42. A linear motion ball bearing 52 is shown supporting the mounting member 36 on the horizontal member 42. In an alternative embodiment (not shown) a pair of low-cost sleeve bearings are used inside a mounting block of increased length.

The function of the described mounting member 36 is to support the linkage arm 38 as will be explained.

It will be realized that while not shown a plurality of linkage arms 38 forming a multiplicity of functional parallelograms for greater support can also be provided.

It will be noted that movement of the mounting member 36 to a different position along the horizontal member 42 will cause a corresponding change in the position of the center of gravity of the seat unit 16 and user relative to the first axis 22. The following table summarizes the various positions of the center of gravity and the corresponding advantages obtained.

TABLE

| POSITION OF CENTER OF GRAVITY | ADVANTAGE GAINED |
|---|---|
| Adjacent the axis 22 of the drive wheels 12 | Least power consumption. |
| Adjacent the axis 22 of the drive wheels 12 | Best for movement on side sloping surface. |
| Adjacent the axis 22 of the drive wheels 12 | Least effort for "wheelie" maneuver. |
| Adjacent the axis 22 of the drive wheels 12 | Easiest maneuverability. |
| Halfway between the 2 wheels | Least overturn danger on level. |
| Near caster wheels 14 | Easy backward stair climbing with helper. |
| Near caster wheels 14 | Least overturn danger on upward slope. |
| Near caster wheels 14 | Easiest dismounting from wheelchair. |
| Adjacent the axis 22 of the drive wheels 12 | Safe traverse of downward slope. |
| Behind drive wheels 12 | To raise caster wheels from ground balance retained by control of drive wheels. |
| Adjust as required | Carry extra load or child. |
| Near drive wheels but unlocked | Easy dynamic curb climbing. |

FIG. 7 shows the linkage arm 38 and a preferred embodiment of its hinges 30, 32. The seat base 18 is hingedly attached to at least one linkage arm 38, which arm is in turn hingedly attached to the mounting member 36 which is slidingly mounted on the frame element 10. Both hinges 30, 32 are configured to restrict the freedom of movement of the linkage arm 38 to only one vertical plane. In the embodiment shown a fixed pin 54 is provided at each hinge center and a removable pin 56 is provided which is insertable in any of a plurality of apertures 58, so that the hinges 30, 32 include integral indent and/or guide and stop means which fully define and delimit predetermined angular positions of the linkage arm 38 with respect to the seat base 18 and the frame element 10.

As has been explained, a change in the linkage arm angle changes the height of the seat unit 16.

There is seen in FIG. 8 an embodiment of the wheelchair adapted to suit a standing user, or for use of a sitting or reclining user who wishes to assume a standing position but is unable to do so without help. Descriptions of how to adjust a wheelchair in order to achieve an upright position exist in many of the references discussed and incorporated herein, including U.S. Pat. No. 4,809,804 to Houston, incorporated herein by reference.

The linkage arm 38 is hingedly attached to the seat base 18 and is arrestable in at least one position defining an angle greater than 90° between the bottom surface of the seat base 18 and the linkage arm 38. Thereby, the positioning of the seat base 18 in an orientation approaching perpendicular with the ground is achieved, for adaptation of the wheelchair for use as a stand-up wheelchair.

In the preferred embodiment shown, an electrically powered hydraulic, pneumatic or mechanical jack 60 is provided for selectively positioning the seat base 18 in an orientation approaching perpendicular to the ground. Obviously the removable pin 56 is previously removed from the upper hinge 30 to allow the jack 60 to carry out its function. A secondary linkage 62 is provided to change the angle between the base 18 and the back 20 as shown.

Also provided in this embodiment are adjustable-height footrests 64, which are adjustable to assume a locked position at a height suitable for normal use or extended to contact the ground when the seat base 18 is oriented in a near-vertical position, A preferred method of operating the adjustable height footrests 64 is by means of a second jack 66.

FIG. 9 shows a further embodiment provided with a pair of auxiliary wheels 68. These are positioned to the rear of the drive wheels 12 at a height above ground level such that the auxiliary wheels 68 contact the ground when the front caster wheels 14 are raised from the ground for a purpose such as going up a curb step 70. Preferably means are provided to allow the horizontal distance by which the auxiliary wheels 68 are behind the first axis 22 of the drive wheels to be varied.

In the preferred embodiment shown the auxiliary wheels 68 are suspended from an arm 72 attached to the mounting member, whereby the horizontal position of the auxiliary wheels 68 may be conveniently varied by the user while remaining seated by moving the seat unit 16 horizontally forward or backward relative to the frame element 10. The auxiliary wheels 68 thus prevent the wheelchair from overturning when moving the seat unit 16 backwards relative to the frame element 10 while traveling on side sloping surfaces or carrying out a "wheelie" maneuver. However, undesirable contact between the auxiliary wheels 68 and the road surface can be avoided by the user moving the auxiliary wheels forward nearer the first axis 22 when their assistance is not required.

It has previously been noted that the auxiliary wheels 68 can support the wheelchair when the drive wheels 12 have been removed for some purpose such as traverse of a narrow passage.

Figure 10:
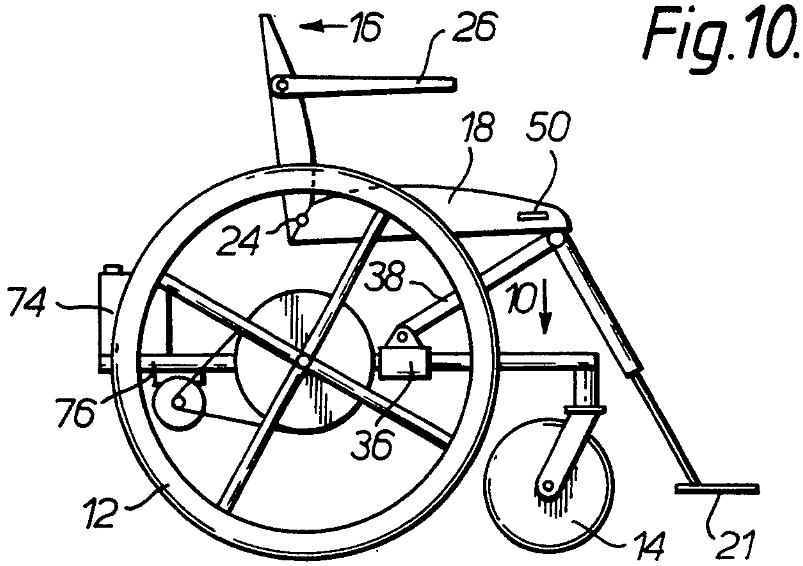
FIG. 10 is a side view of yet a further embodiment of the wheelchair provided with an electric drive attachment.
Figure 14:
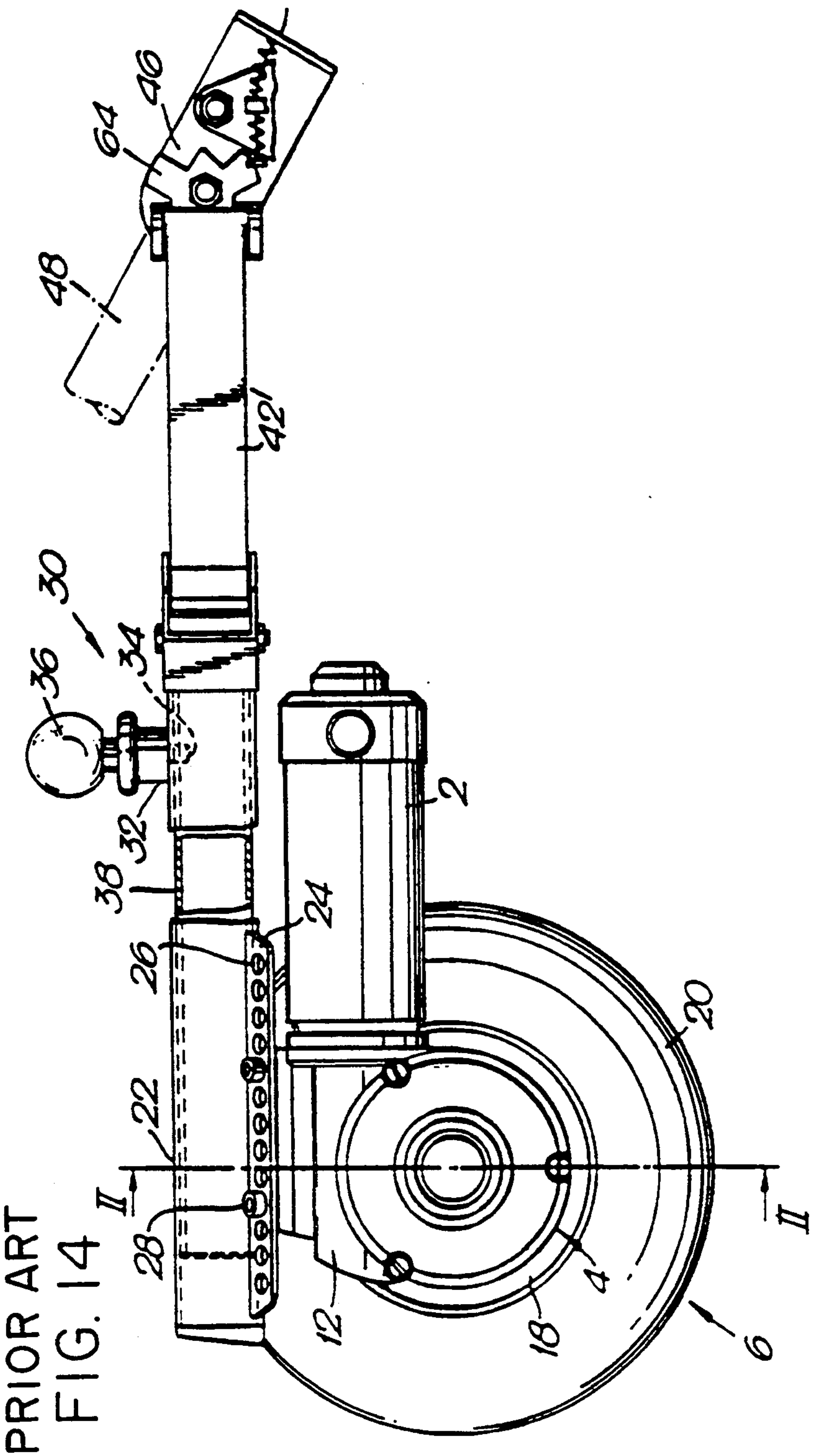
PRIOR ART FIG. 14
FIG. 14 is a partial side view of a prior art wheelchair having an electric motor 2.
Figure 15:
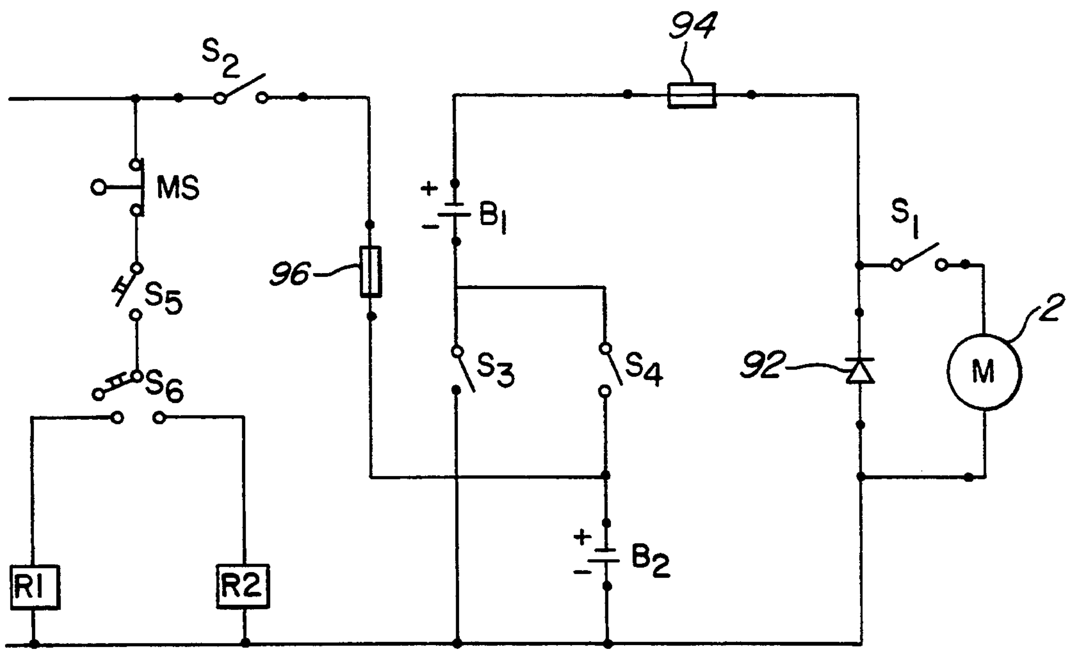
PRIOR ART FIG.15
FIG. 15 is a circuit diagram of the prior art motor depicted in FIG. 14.

FIG. 10 shows yet a further embodiment of the wheelchair provided with an electric drive attachment 74. Such attachments are well known and require no description. FIG. 14 illustrates the electric motor and FIG. 15 illustrates the corresponding circuit diagram of U.S. Pat. No. 5,113,959, already incorporated herein. In addition, U.S. Pat. No. 4,951,766 to Basedow et al describes another electric wheelchair, incorporated herein by reference. An extension 76 of the frame element is added to provide a mounting member for the attachment 74. The weight of the attachment 74 is compensated for by moving the seat unit 16 further forward than in previous embodiments.

FIG. 11 shows again the embodiment which has been previously described with reference to FIG. 2 but is here shown as adjusted for use by a reclining person. This has been achieved by lowering the inclination of the back 20 by use of the hinge 24, and by raising the footrests 21 to a horizontal position. Such adjustment would be of utility to allow a user to sleep in the wheelchair and for hospitals for moving unconscious patients. Numerous other references have described various ways for a back which is hinged to a base to be adjusted. For such descriptions, see GB 2,201,588A to Dermot Moynes; GB 2,171,898A to David Brady et al; U.S. Pat. No. 3,379,450 to E. Jones et al, all incorporated herein by reference.

Figure 12:
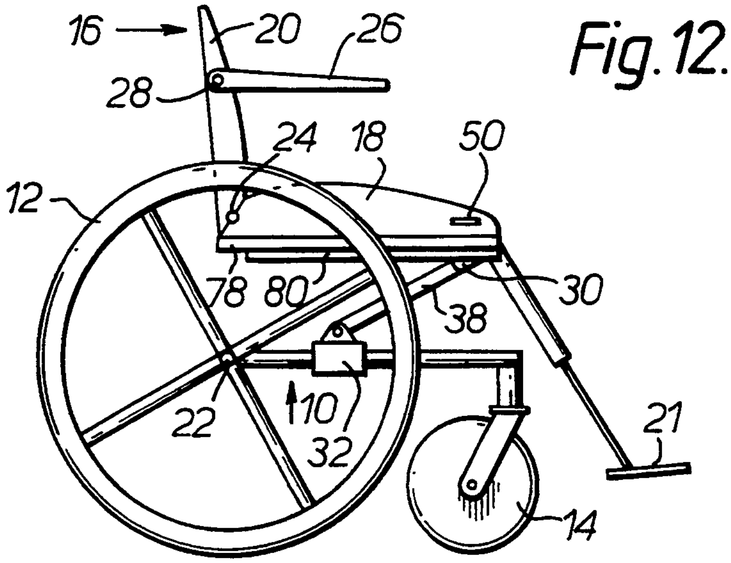
FIG. 12 is a side view of an embodiment wherein the seat is mounted on horizontal sliding rails.

FIG. 12 shows the seat unit 16 mounted on horizontal sliding rails 78, 80. At least one rail is provided; the embodiment shown is provided with a pair of parallel rails. The rails 78 are fixedly attached to the base 18, and are shaped to be guided by the rails 80 engaging the rails 78 and free to slide axially therealong. The linkage arm 38 is attached to and supports the rail 80 via the hinge 30, whereby in conjunction with the hinge 32 the wheelchair may be collapsed when required as shown in FIG. 3. The hinge 32 is fixedly attached to the frame element 10. As in previous embodiments, the height of the seat unit 16 may be altered by changing the angle of the linkage arm 38 as has been explained with reference to FIG. 7.

Figure 13A:
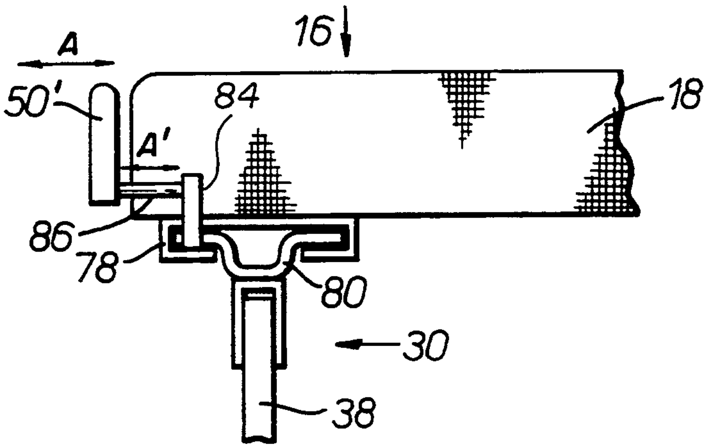
FIGS. 13A and 13B show details of these rails.
Figure 13B:
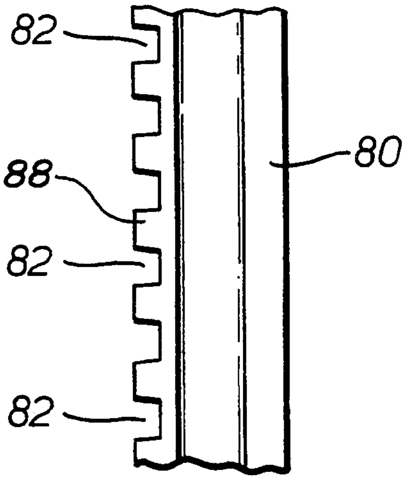

FIGS. 13A and 13B show details of the rails 78, 80. One edge of the rail 80 is provided with a series of apertures 82, any one of which may be engaged by a pin 84 connected by a short shaft 86 to the handgrip 50'. Thereby the user, while remaining seated, may slide the seat unit 16 forward or backward to any desired position while temporarily releasing the pin 84 from engagement with the apertures 82 by pulling and pushing handgrip 50' along the axis of arrow A. The user is able to disengage pin 84 by moving the handgrip 50 away from seat unit 16 by a distance A, which results in pin 84 being moved a distance A' out of an aperture 82 and into the space defined by the horizontal distance A' which is between rail 78 and projection 88.

When pin 84 is located in the space, the user may slide the pin 84 forward and backward to a desired position. Then, when the user releases the pin 84, if the pin 84 is spring-loaded, the pin 84 will move horizontally toward a seat unit 16 and into an aperture 82, with two projections 88 holding it in the aperture. Otherwise, among other approaches to placing pin 84 in an aperture 82, the user may simply push handgrip 50 toward the seat unit 16, thereby pushing the pin 84 into aperture 82. The way in which the pin 84 is engaged and disengaged in apertures 82 is similar to the way that plunger 34 is withdrawn from and dropped into holes 52 and 53 of U.S. Pat. No. 5,113,959.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hand-propelled wheelchair comprising:

a frame element;

a horizontal first tubular frame bar of the frame element defining a first axis at least one horizontal tubular member of the frame element having a front portion and a rear portion, the rear portion being integral with and generally perpendicular to the first frame bar;

first and second large drive wheels being rotatably mounted to first and second ends of the first frame bar;

a seat unit;

a base of the seat unit having a front edge and a rear edge, the rear edge being hingedly attached to a back of the seat unit;

at least one linkage arm being hingedly attached to the front edge of the base at one end and slidably mounted to at least one horizontal member at the other end;

at least one front caster wheel being revolvably connected to a front portion of at least one horizontal member;

an engagement and release means connected to the at least one linkage arm for sliding the linkage arm along the at least one horizontal member while the base and back are generally perpendicular to each other; and the engagement and release means varying the center of gravity of the wheelchair.

2. The wheelchair according to claim 1 wherein said drive wheels are demountably attached to said frame element whereby said back can be folded onto said base which in turn can be folded onto said frame element to form a compact array upon demounting of the drive wheels from the frame.

3. The wheelchair according to claim 1 wherein said frame element is rigid.

4. The wheelchair according to claim 1 wherein said seat unit is attached to said frame element via a linkage arrangement for varying at least one of the geometric factors of the vertical distance between said base and said frame, angle of inclination of said seat base relative to said frame, and horizontal distance between said seat base and said drive wheels.

5. The wheelchair according to claim 4 wherein said base is hingedly attached to at least one linkage arm which arm is in turn hingedly attached to a mounting member slidingly mounted on said frame element.

6. The wheelchair according to claim 5 further provided with means for frictional engagement of said mounting member to said frame element.

7. The wheelchair according to claim 5 further provided with means for selectively clamping and unclamping said mounting member to said frame element.

8. A hand-propelled wheelchair according to claim 7, further comprising:

an orthopedically contoured seat unit;

said base and back being arrestable in at least one position defining an angle of greater than 100° between each other to provide the wheelchair with a reclining backrest; and a coil spring assembled around and frictionally engaging and clamping a horizontal member of said frame element, one extremity of said spring being attached to said mounting member and the remaining extremity being attached to a tensioning device, which device, in a first position slightly unwinds and expands the coil spring diameter and in a second position causes the coil spring diameter to revert to a smaller dimension.

9. The wheelchair according to claim 6 wherein said hinges include integral indent, guide and stop means which fully define and delimit predetermined angular positions of said linkage arm with respect to said base and said frame element.

10. The wheelchair according to claim 9 wherein said hinges are configured to restrict the movement of said linkage arm to only one plane.

11. A hand-propelled wheelchair according to claim 2, further comprising:

a first, C-shaped rail having a convex outer surface and a concave inner surface, the convex surface of the rail being fixably attached to and extending along the base of the seat unit;

a second rail being slidably engaged within the C-shaped rail and being pivotally connected to the frame element;

a plurality of projections being spaced apart from each other and being integral with an edge of the second rail such that an engagement and release means is slidably movable from engagement between two adjacent projections to engagement between two other adjacent projections.

12. A hand-propelled wheelchair comprising:

a frame element;

a horizontal first tubular frame bar of the frame element defining a first axis at least one horizontal tubular member of the frame element having a front portion and a rear portion, the rear portion being integral with and generally perpendicular to the first frame bar;

first and second large drive wheels being rotatably mounted to first and second ends of the first frame bar;

a seat unit;

a base of the seat unit having a front edge and a rear edge, a seat back hingedly attached to a seat of the seat unit;

at least one linkage arm being hingedly attached to an edge of the base at one end and slidably mounted to at least one horizontal member at the other end;

at least one front caster wheel being revolvably connected to a front portion of at least one horizontal member;

an engagement and release means connected to the at least one linkage arm for sliding the linkage arm along the at least one horizontal member while the base and back are generally perpendicular to each other; and the engagement and release means varying the center of gravity of the wheelchair.

* * * * *